United States Patent [19]

Gordon

[11] Patent Number: 5,009,190
[45] Date of Patent: Apr. 23, 1991

[54] TANK COVER III

[76] Inventor: Richard A. Gordon, 95 W. 3rd St., Freeport, N.Y. 11520

[21] Appl. No.: 393,575

[22] Filed: Aug. 14, 1989

[51] Int. Cl.[5] .................... A01K 63/02; A01K 1/03
[52] U.S. Cl. ........................................ 119/5; 119/15
[58] Field of Search ............... 119/5, 15, 17; 160/372

[56] References Cited

U.S. PATENT DOCUMENTS

| | | | |
|---|---|---|---|
| 257,348 | 5/1882 | Lloyd | 160/372 |
| 364,385 | 6/1887 | Trenholm | 160/372 |
| 400,840 | 4/1889 | Friedman | 119/5 |
| 813,727 | 2/1906 | Marquardt | 160/372 |
| 1,159,144 | 11/1915 | Willhoite | 160/370 |
| 2,817,314 | 12/1957 | Carlin | 119/17 |
| 2,888,070 | 5/1959 | Smith | 160/372 |
| 3,234,905 | 2/1966 | Olson | 119/5 |
| 3,297,001 | 1/1967 | Locke et al. | 119/17 |
| 3,807,357 | 4/1974 | Hall | 119/5 |
| 3,841,267 | 10/1974 | Miller | 119/5 |
| 3,857,366 | 12/1974 | Willinger | 119/5 |
| 4,272,672 | 6/1981 | Goldman et al. | 119/5 |
| 4,313,048 | 1/1982 | Holbrook | 119/5 |
| 4,763,607 | 8/1988 | Tominaga | 119/17 |

*Primary Examiner*—Paul J. Hirsch
*Attorney, Agent, or Firm*—Bauer & Schaffer

[57] ABSTRACT

A cover formed of two telescoping tray-like sections each having a screen surrounded by a unitary frame, to which depending skirts along three of its sided are applied. The tray-like sections are identical with one of the trays being narrower in the transverse direction and have cooperating means for securing the trays together in a selected one of at least two predetermined telescoping positions.

4 Claims, 2 Drawing Sheets

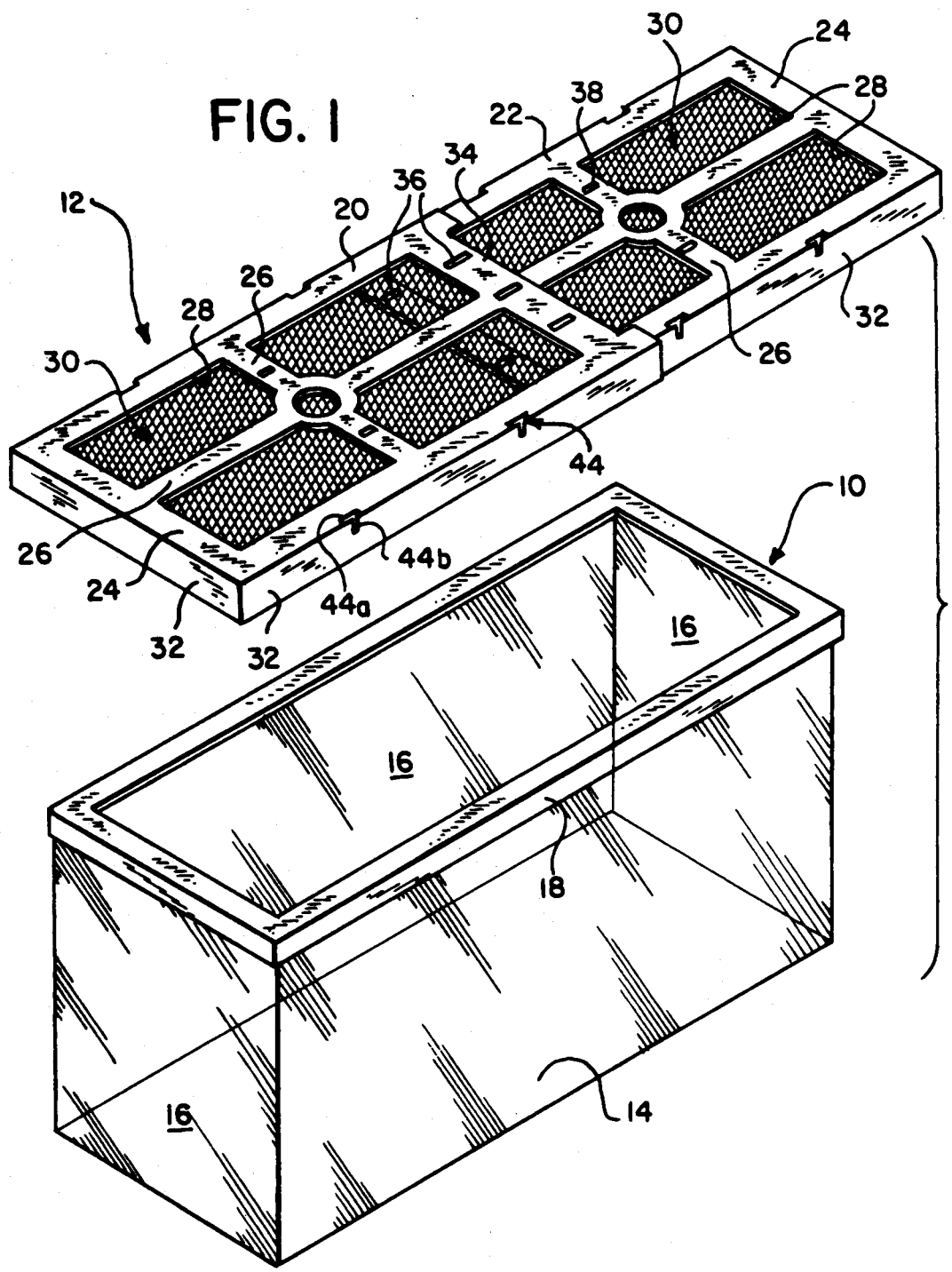

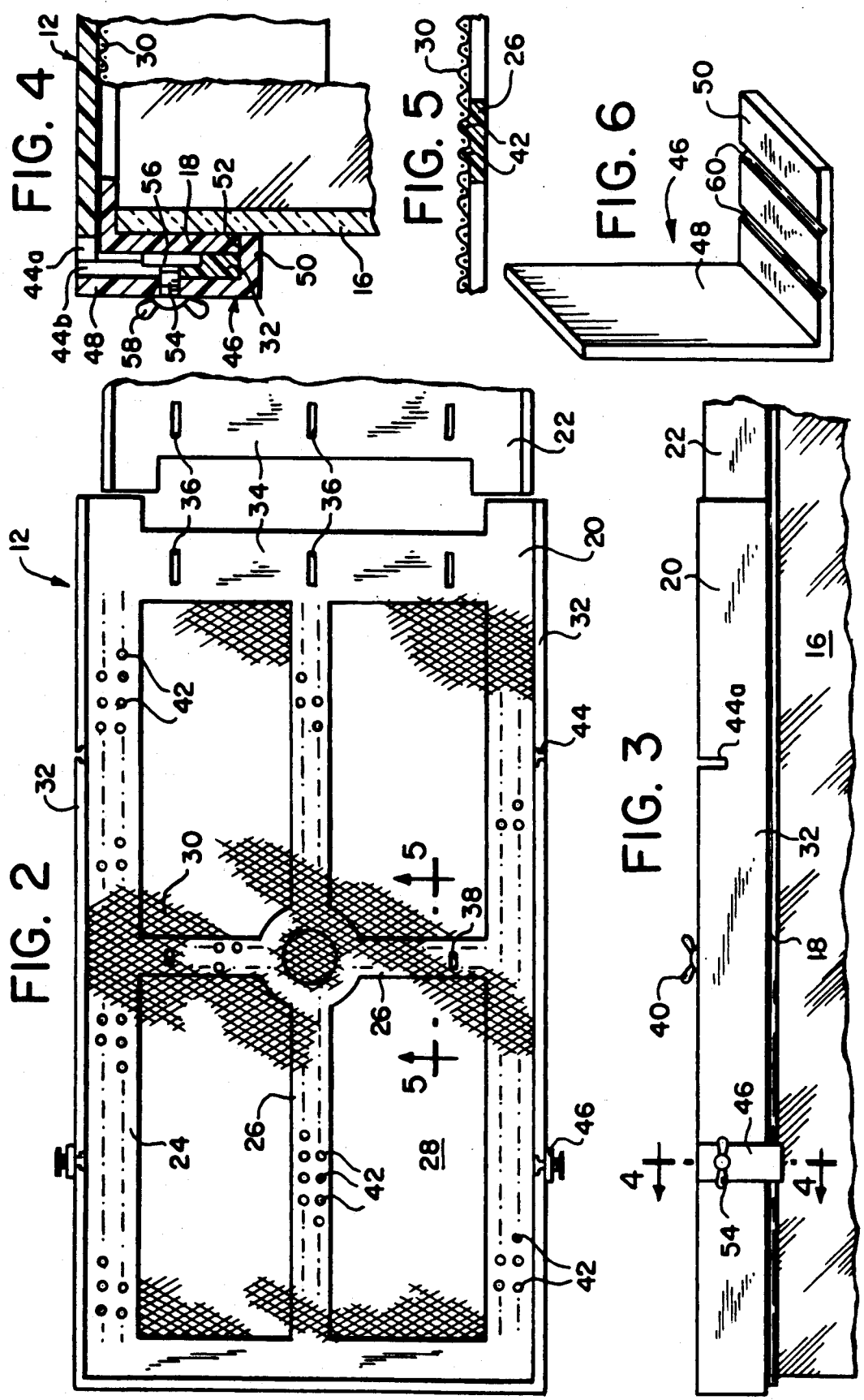

ized by the numeral 12.

TANK COVER III

BACKGROUND OF THE INVENTION

The present invention is directed to a cover for an animal tank, or reptile tank, particularly to a cover which may be easily installed over the tank and easily removed therefrom and which in the installed position, is secured thereto so that it cannot be dislodged.

It is well known that tanks require covers, which, while permitting normal communication with the atmosphere, enclose the tanks so that the reptile or animals therein cannot lift or displace the same enabling escape or allowing children to inadvertently access or drop foreign objects into the tank. On the other hand, the cover must be easily removable so that the necessary access to the tank for feeding the animals or reptile or for cleaning the tank can be accomplished.

In my earlier patent, U.S. Pat. No. 4,576,115, and copending U.S. Pat. application Ser. No. 205,311 filed June 9, 1988, I showed covers for small animal tanks or for fish tanks. The tanks and the covers themselves were relatively small and therefore, the covers could be small. On the other hand, commercially available reptile tanks and large animal tanks are larger than those shown in the aforementioned patent or application and in fact, customarily range in size from 36 inches to 54 inches in length, although each conforms to a more or less standard width. Accordingly, retailers and pet shops, as well as manufacturers, must stock a plurality of different sized covers in order to have sufficient numbers fitting each of the various tank sizes. This presents a burden on both the manufacturer and the retailer.

A further problem arises when covers having a fixed size are made, in that the user often experiences difficulty in adapting the fixed size cover to the actual tank in use. No provision is made for minor adjustment to the cover to conform to off-sized tanks or even to the differences in manufacturing tolerances.

It is the object of the present invention to provide a cover for animals tanks and the like which satisfies the requirements indicated above. It is a further object of the present invention to provide a cover which may be firmly secured to the tank against inadvertent removal and yet which can be easily released and removed for the necessary access to the tank.

The foregoing objects, together with other objects and advantages, will be apparent from the following disclosure of the present invention.

SUMMARY OF THE INVENTION

According to the present invention, a cover is provided for an animal tank, or the like which has an open top, and peripheral side portions having an exterior peripheral band or lip along its upper edge. The cover comprises a pair of telescoping tray-like sections, each of identical construction and of the same length except that one section is slightly narrower than the other so as to slidably fit therein. Each tray-like section consists of a flat screen attached integrally to a continuous rectangular frame, reinforced by coplanar longitudinal and transverse ribs so as to provide a plurality of openings covered by the screen and yet be rigid and stable. Depending from the longer longitudinal edges and from one smaller transverse edge of the frame of each tray-like section, is a depending skirt, while the remaining transverse edge is flat and without the skirt. Thus, the combined tray-like sections, provide in cross-section, a unitary cover having a horizontal wall formed by the frame adapted to rest on top of the tank and a vertical wall formed by the depending skirt adapted to fit over the peripheral side portion of the top of the tank.

Each tray-like section is provided with a plurality of holes and slots arrayed in the border and rib members so as to be aligned in predetermined registry to provide combined lengths in a variety of sizes. Suitable fasteners such as screws or wing-nuts are used to lock the sections in place.

The frame is provided with a plurality of resilient depending locking brackets having horizontally directed flanges which are adapted to engage beneath the lip of the tank. Means are provided for biasing locking brackets into engagement with the walls of the tank to lock and secure the cover on the tank.

Full details of the present invention are set forth in the following disclosure and illustrated in the accompanying drawings.

DESCRIPTION OF THE DRAWINGS

FIG. 1 is a perspective view of an animal tank on which a cover according to the present invention is placed;

FIG. 2 is a BOTTOM plan view of one section of the cover piece shown in FIG. 1;

FIG. 3 is a partial side elevational view of the cover positioned on the tank;

FIG. 4 is a cross sectional view of the cover and tank taken along line 4—4 of FIG. 3;

FIG. 5 is a cross sectional view of the cover taken along line 5—5 of FIG. 2; and FIG. 6 is a perspective view of a locking bracket for securing the cover to the tank.

DESCRIPTION OF THE INVENTION

FIG. 1 illustrates a tank, generally depicted by the numeral 10, provided with a plastic cover generally depicted by the numeral 12.

The tank 10 is of conventional form and preferably in the shape of an open topped rectangular parallelepiped, having a base 14 to which is integrally formed walls 16 of plastic, glass or other rigid transparent material. The walls 16 may be unitarily formed or sealed along abutting edges to fluidly or hermetically seal the tank so that it is useful to house animals, reptiles, fish and the like.

Secured about the periphery of the tank 10 to form its upper edge, is a continuous rigid band forming a lip 18 on which the cover may be fit. The lip 18 may be metal or plastic as desired and is of such thickness a to provide a shoulder along its lower edge extending perpendicularly to the walls 16.

In accordance with the present invention, the cover 12 being preferably made of molded plastic, or lightweight metal is formed in two tray-like sections 20 and 22 which are identical except that one section 22 is slightly narrower than the other section 20, so that section 22 can fully slide within section 20. Each tray section 20 and 22, consists of a planar upper frame having border 24 and intersecting flat reinforcing ribs 26 defining a plurality of openings 28. The shape of the openings 28 and reinforcing ribs 26 are not critical and the rectangular openings 28 shown are illustrative only. The openings 28 in each tray cover are closed by a continuous sheet of screening or other mesh material 30. Integrally formed along edges of three of the frame borders 24 of each cover section 20 and 22 and depending therefrom is a skirt 32 of a depth sufficient to cover the peripheral band 18. The fourth edge 34 of each tray-like section 20 and 22, is free of any depending skirt and its frame border portion is somewhat wider, thereby allowing the two tray sections 20 and 22 to slidably telescope one within the other.

By telescoping the two tray-like sections 20 and 22 between an extreme inward and extreme outward position, they may be made to fit different tanks 10 of varying sizes. To fix the tray sections 20 and 22 in predetermined sizes, for example to fit a tank of 36 inches or 54 inches in length, each tray section 20 and 22 is formed with fastening slots 36 in the frame border adjacent to the fourth edge 34 and holes 38 in the transverse reinforcing rib 26. The fastening slots 36 run parallel to the longitudinal direction of the cover and have a selected length such as approximately one half inch or more to provide additional tolerance for further adjustment. The fastening holes 38 need not be enlarged although they may be.

Two fastening holes 38 and three fastening slots 36 are provided. The fastening holes 38 are axially aligned with the laterally outer fastening slots 36. Thus, when in telescoping the trays, the slots 36 of the smaller tray section 20 will register with the holes 38 of the large tray section 22 so that the cover will assume the smaller predetermined size. When the two tray sections are extended outwardly, the slots 36 of the smaller tray section 20 register with the corresponding slots 36 in the larger cover section 22, thus defining the larger predetermined size. Suitable fasteners 40 such as screw and wing nuts are placed through the slots 36 and holes 38 depending on condition of registry to secure the two tray-like sections firmly and fixedly together in their predetermined sizes. The slots 36 allow the user to shift the tray-like sections for further precise adjustment when actually placed on the tank.

Of course, it will be obvious that the slots 36 and holes 38 may be arrayed in different positions to provide cover sizes anywhere between the 36 and 54 inch sizes illustrated. Likewise, the shape or form of the cover sections may be modified to be of different lengths o to provide other sizes.

The provisions three slots 34, is helpful to provide greater strength when the tray-like sections are extended since it enables the user to employ an additional fastener holding the tray-like sections securely together, since there is little overlapping of the frame. On the other hand, two holes 38 are sufficient to join the tray-like sections in the smaller sizes, since considerable overlapping is provided.

As indicated earlier, the screen 30 covers the entire bottom surface of the tray sections 20 and 22. To firmly and permanently secure the screen 30 in place, the bottom surface of the tray sections are provided with continuous rows of beads 42 parallel to the direction of each border 24 and reinforcing ribs 26. If the tray-like sections are made of molded plastic, these beads are easily formed during the molding of the tray sections. Thus, after the screen is placed in position, the beads 42 may be upset by a heat pressing operation so that the plastic material of the beads 42 flow into the spaces of the screen 30 and when cooled, integrally secures the screen in place. This can also be accomplished in situ in the mold press simultaneously. On the other hand if the cover is made of lightweight metal or aluminum, the screen can be spot welded, glued, or otherwise conventionally fixed in place.

Since the present tank cover is advantageous for tanks holding large and relatively strong reptiles, animals or the like, a mechanism should be provided to securely fix and hold the cover 12 on the tank 10 when in use. Thus, each of the longitudinal edges of each tray section is formed with at least two T-shaped slots 44 cut into the corner formed by the abutment of the frame border 24 and the depending skirts 32. As seen more clearly in FIGS. 3 and 4, the transverse bar 44a of the T-shaped slot 44 is cut into the horizontal frame border 24 while the vertical stem 44b is cut into the depending skirt 32. An L-shaped bracket 46 (FIG. 5) is provided which is placed against the outer surface of the skirt 32 so that the vertical arm 48 abuts against the skirt face and the horizontal arm 50 passes beneath the shoulder 52 of the peripheral lip 18. A screw 54 having an enlarged head 56 is inserted through the T-shaped slot so that the head 56 moves down in the slot and abuts the inner surface of the depending skirt 32. The screw 54 is held by a wing nut 58 applied on the outer surface of the L-shaped bracket 46.

The cover 12 is applied over the tank 14 as shown in FIG. 4, so that the horizontal frame border 24 rest on the upper edge of the tank 10 with the skirt 32 depending over the band 18. In this condition, the head 56 of the screw 54 holding the bracket 48 is wedged between the lip 18 of the tank and the skirt 32. Consequently, when the wing nut 58 is tightened, a force is generated which presses the horizontal arm 50 of the bracket 46 firmly into contact with the wall 16 of the tank beneath the shoulder 52 of the band. The cover is then fixed against removal by the animal or inadvertently by a child or adult.

To insure that proper fit is obtained, the bracket 46 even with off-size tanks as shown in FIG. 6, has its horizontal arm 50 of the bracket 46 is provided with a plurality of grooved recesses 60 allowing the user to cut the arm 50 the to size of the shoulder 52 (i.e. shorten it to desired length to fit the band of the tank).

As seen from the foregoing, a truly adjustable cover is provided for varying sized tanks. The two tray-like sections each have a screen surrounded by a continuous frame having depending skirts along three sides, so that they may be easily telescoped in sliding conditions. Each tray is provided with means cooperating with similar means in the other tray allowing the tray-like sections to be secured in selected predetermined positions, so that, in cross-section, the horizontal screen wall will rest on the upper edge of the tank while the skirts surround the peripheral lip of the tank. The locking brackets serve to fix the cover securely after placement on the tank.

While the present invention has been suggested for use with rectilinear parallelepiped tanks of between 36 inches to 54 inches in length, it will be apparent that sectioned covers of different shape and size can be formed in accordance with the teachings herein.

Various modification, changes and embodiments have been disclosed herein. Others will be obvious to those skilled in the art. Accordingly, it is to be understood that the foregoing disclosure is illustrative only and not limiting to the invention.

What is claimed is:

1. An adjustable cover for use with an animal tank or the like of several sizes, each of said tanks having an open top provided with edge portions having an exterior lip, said cover comprising two telescoping rectilinear tray-like sections each having a screen peripherally surrounded by a unitary flat frame member and depending skirt formed along three of the sides of each of the frame members, each of said tray-like sections being identical with one of said trays being narrower in the transverse direction, each of said trays having a flat rib extending transversely between the longitudinally extending portions of the frame members said flat rib being spaced from the open side, each of said flat rib and the portion of the frame member along the open side, having a row of holes formed therein, each row extending transversely to the direction of telescoping of said trays, at least some of the holes in one row of each tray being aligned with some of the holes in a row in the other of said trays along a line parallel to the direction of telescoping of said trays, so that the holes in one of the trays register with the aligned holes in the other tray, said cover including fastening means for insertion into the registered holes for securing said trays together in a selected one of at least two predetermined telescoping positions, the cross section of said secured tray defining a horizontal wall adapted to rest upon the top of said tank and a continuous peripheral wall adapted to fit about the exterior lip wherein each of the frames comprises a rectangular border having transverse and longitudinal reinforcing ribs.

2. The cover according to claim 1, wherein at least the holes in one row are elongated in the direction of the telescoping to provide adjustments.

3. The cover according to claim 1, including means for securing said cover to said tank comprising a plurality of slots forming in the lateral depending skirts in each frame, said slots extending vertically to the horizontal, including L-shaped brackets having a vertical and horizontal arm, removable fasteners for holding a selected one of said brackets in a selected one of said slots said fasteners passing through the vertical arm of the associated bracket and the slot to enable the horizontal arm of said bracket to engage the wall of said tank below the peripheral lip of said tank to thereby prevent said cover from being removed from said tank.

4. The cover according to claim 3, wherein said fastener comprises a screw and nut, said screw having a flat head adapted to be placed within said cover between said skirt and said lip to be held therebetween.

* * * * *